United States Patent Office 3,558,683
Patented Jan. 26, 1971

---

3,558,683
ORGANOSILICON CONTAINING CARBOXYLIC ACID DERIVATIVES
Igal Belsky, Ramat-Gan, and David Gertner and Albert Zilkha, Jerusalem, Israel, assignors to Yissum Research Development Company, Jerusalem, Israel, a company of Israel
No Drawing. Filed Mar. 20, 1967, Ser. No. 624,150
Claims priority, application Israel, Mar. 23, 1966, 25,441
Int. Cl. C07f 7/02
U.S. Cl. 260—448.2       3 Claims

ABSTRACT OF THE DISCLOSURE

Amides, ureides, thioureides and guanidine derivatives of the following general formula, and to processes for the preparation of these compounds.

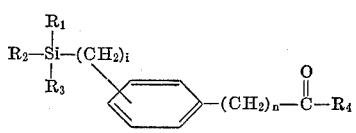

wherein the benzene ring is substituted in the ortho, meta or para position by radical containing a tri-substituted silyl group ($R_1R_2R_3Si$), $R_1$, $R_2$ and $R_3$ are alkyl or aryl groups, same or different having up to 10 carbon atoms, $n$ is zero or a whole number from 1 up to 10, $R_4$ is a residue of ammonia, hydroxylamine, hydrazine or N-alkyl or aryl substituted hydrazine, or a primary or a secondary amine whether substituted or unsubstituted, aliphatic aromatic or heterocyclic, or the residue or urea, thiourea or guanidine, or their substituted derivatives, all said residues being connected through nitrogen to the C=O group; $i$ is zero or one. These materials serve as central nervous system depressants.

---

This invention relates to new amide, ureide, thioureide and buanidine derivatives of silicon containing carboxylic acids and their preparation. More particularly the invention relates to amides, ureides, thioureides and guanidine derivatives of the following general formula, and to processes for the preparation of these compounds.

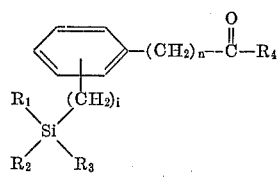

Wherein the benzene ring is substituted in the ortho, meta or para position by radical containing a trisubstituted silyl group ($R_1R_2R_3Si$), $R_1$, $R_2$ and $R_3$ are alkyl or aryl groups, same or different having up to 10 carbon atoms, $n$ is zero or a whole number from 1 up to 10, $R_4$ is a residue of ammonia, hydroxylamine, hydrazine or N-alkyl or aryl substituted hydrazine, or a primary or a secondary amine whether substituted or unsubstituted, aliphatic aromatic or heterocyclic, or the residue of urea, thiourea or guanidine, or their substituted derivatives, all said residues being connected through nitrogen to the C=O group; $i$ is zero or one.

To be excluded from this general formula, trialkyl silyl benzamides and trialkyl silyl benzanilides.

The invention also relates to the appropriate amino derivatives obtained by reduction of the carbonyl group of the above mentioned amides, and to their water soluble salts. To be excluded are the corresponding unsubstituted trialkyl silyl benzylamines and the N-mono and dialkyl substituted phenyl ethylamines which are covered in our previous application, (U.S. Ser. No. 502,442; Oct. 22, 1965).

The invention also relates to new silica containing carboxylic acids, their ester and acyl halide derivatives of the following general formula, which serve as intermediates in the preparation of the novel amides.

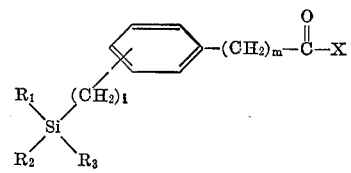

wherein $m$ is a whole number from 1 to 10, $R_1$, $R_2$ and $R_3$ represent alkyl or aryl groups as described before and X is hydroxyl, alkoxyl, preferably methoxyl or ethoxyl, phenoxy or substituted phenoxy or halogen, excluding the trialkyl silyl phenyl acetic acids which are covered in our copending application (U.S. Ser. No. 502,442 filed Oct. 22, 1965 and now Pat. No. 3,505,376) $i$ is 0 or 1.

The invention also relates to new silicon containing aralkyl halides, alcohols and nitriles of the following general formula which are also used as intermediates.

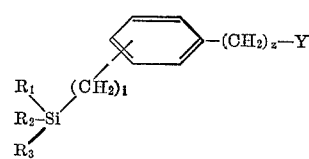

where $R_1$, $R_2$ and $R_3$ are as described before, $z$ is an integer from 3 to 10, Y is a halogen, a nitrile or a hydroxyl group, $i$ is as described before.

Amides and ureides of substituted benzoic and phenylacetic acids are characterized by physiological activity and serve as central nervous system depressants.

The presence of the bulky trialkyl silyl group influences the solubility, partition coefficient and permeability to physiological membranes of the new amide and ureides claimed in this invention and these affect their physiological activity.

The new silicon containing carboxylic acids used as intermediates in the present invention can be prepared by various methods, for example by the malonic ester synthesis, by carbonation of the Grignard reagent or by hydrolysis of a nitrile group.

These methods require the use of new intermediates such as the corresponding silicon containing aralkyl halides or nitriles. These halides are prepared starting from the corresponding alcohols.

The new silicon containing alcohols according to the present invention are prepared by reduction of the corresponding silicon containing carboxylic acids.

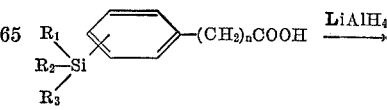

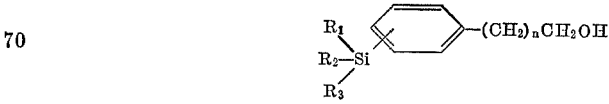

From these alcohols the corresponding alkyl halides may be prepared by various methods. For example chlorides can be prepared by reaction of the alcohol with thionyl chloride in the presence of a reagent which can neutralize the hydrogen chloride evolved to prevent cleavage of the silicon aryl bond.

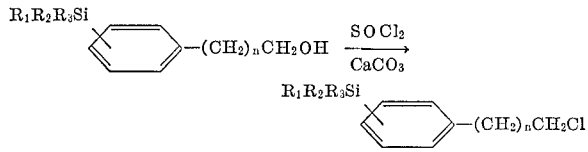

The nitriles are obtained by reaction of the corresponding halides with potassium or sodium cyanide.

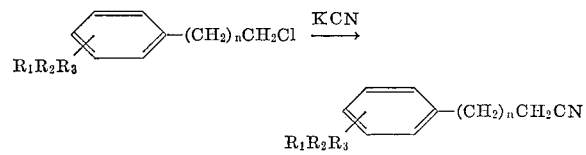

The use of the malonic ester syntheses according to the present invention may be illustrated by the preparation of β-(p-trimethyl silyl)-phenyl propionic acid.

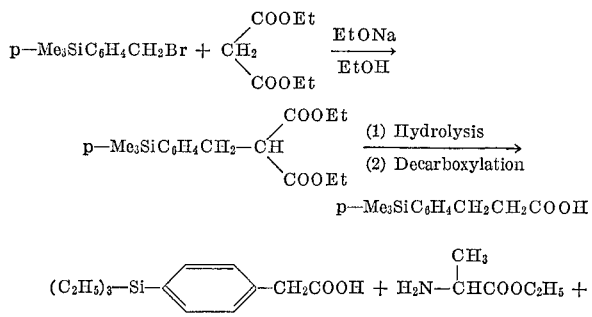

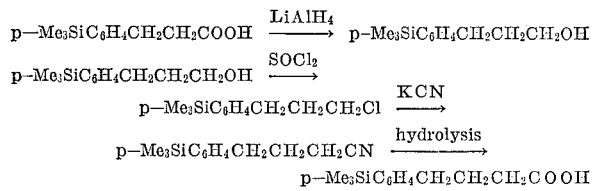

The preparation of the silicon containing carboxylic acids by hydrolysis of a nitrile group may be illustrated by the preparation of γ-(p-trimethylsilyl)-phenylbutyric acid. This acid is prepared starting from the lower homologue in the following series of reactions.

p—Me₃SiC₆H₄CH₂CH₂COOH $\xrightarrow{\text{LiAlH}_4}$ p—Me₃SiC₆H₄CH₂CH₂CH₂OH
p—Me₃SiC₆H₄CH₂CH₂CH₂OH $\xrightarrow{\text{SOCl}_2}$
p—Me₃SiC₆H₄CH₂CH₂CH₂Cl $\xrightarrow{\text{KCN}}$
p—Me₃SiC₆H₄CH₂CH₂CH₂CN $\xrightarrow{\text{hydrolysis}}$
p—Me₃SiC₆H₄CH₂CH₂CH₂COOH It may be noted from these series of reactions that the synthesis of acids via the nitriles produces a homologue acid having one more CH₂ group, while the use of the malonic ester synthesis leads to the production of a homologue having two more CH₂ groups.

The acid halides of the silicon containing carboxylic acids may be prepared by known methods. The acid chloride derivatives according to the present invention are prepared by reaction of the acids with thionyl chloride in the presence of calcium carbonate.

The ester derivatives of the silicon containing carboxylic acids encompassed in the present invention may be prepared by known methods. However, due precautions must be taken not to cleave the Si-Aryl bond by using very drastic conditions.

Various methods can be used to prepare the silicon containing amides. A convenient method involves reacting one equivalent of the acyl chloride with a cooled stirred solution of two equivalents of the appropriate amine. After stirring for some hours at room temperature the reaction mixture is left overnight. The solvent is removed in vacuo and dry acetone is added. The amine-HCl formed is filtered, washed with acetone, and the combined acetone solutions evaporated leaving the amide. Water is added and the amide is filtered, washed repeatedly with dilute sodium hydroxide, dilute hydrochloric acid and water. The products may be recrystallized from ethanol-water.

When chloroform was used as solvent yields of the amides as high as 90% were obtained. Carbon tetrachloride was also found to be a useful solvent.

Somewhat lower yields were obtained when tetrahydrofuran was used as solvent, but even these were generally not below 75%.

It is possible also to carry out the acylation reaction using one equivalent of the amine in the presence of triethylamine to trap the hydrogen chloride formed.

The method of isolating the amide mentioned above is generally applicable. However, there are cases where the amide does not crystallize out easily. In these cases it may be distilled out under high vacuo.

Another useful method for the preparation of the amide derivatives is the reaction of the silicon containing carboxylic acid with the amine in the presence of carbodiimdes such as dicyclohexyl carbodiimide which serve as condensing agents.

This may be exemplified by the preparation of p-triethylsilylphenyl acetyl alanine ethyl ester:

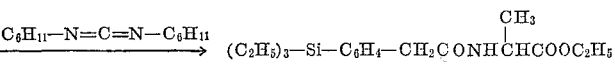

Another method for the preparation of the amide derivatives is to use active esters, such as phenyl esters of the silicon containing carboxylic acids as acylating agents. This may be exemplified by the acylation of imidazole by p-nitrophenyltrimethylsilylbenzoate:

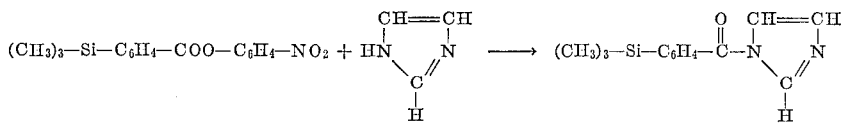

The amide derivatives of the present invention may be prepared from a wide variety of amines. Primary and secondary amines are included. These may also be substituted.

As specific examples, butylamine, methylamine, ethylamine, dimethylamine, phenylethylamine, trimethylsilylphenylethylamine, allyl amine, 1-N-dimethyl amino-2-propylamine, p-trimethylsilyl benzyl amine, and p-triethylsilylphenylethyl amine may be mentioned. Esters of α, β and γ amino acids are also included. As specific examples may be mentioned, alanine ethyl ester, N-ε-carbobenzoxy-L-lysin ethyl ester, and leucine ethyl ester. Heterocyclic amines such as morpholine, indole, imidazole and piperidine are also included. Other examples include aniline, toluidine, anisidine, phenetidine, naphthylamine, carbethoxyaniline and carbomethoxyaniline.

Primary amides of the silicon containing carboxylic acids were obtained by treating the appropriate acyl chlorides with concentrated ammonia.

The hydroxamic acids contemplated in the present invention can be obtained by several methods, such as reaction of the corresponding ester or acyl halide derivative with hydroxylamine:

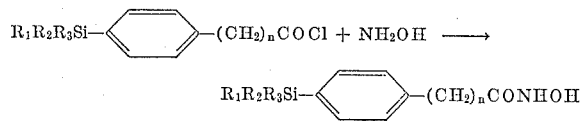

wheere $R_1R_2R_3$ and $n$ are as described before.

The hydroxamic acids gave positive color reaction with ferric chloride.

Similarly the hydrazides of the present invention are prepared by reaction of hydrazine, or substituted hydrazine with the ester or acyl halide derivatives of the carboxylic acid.

The ureide, thioureide and guanidine derivatives of the silicon containing carboxylic acids contemplated in the present invention are prepared by treating one equivalent of acyl chloride with excess of urea, thiourea, guanidine or their substituted derivatives in a small volume of benzene. After heating the mixture for about two hours on a water bath it is poured into water. The acyl derivatives are purified by washing repeatedly with water and dilute sodium hydroxide. Compounds such as trialkylsilylbenzoyl guanidine and trialkylsilyl phenylacetyl guanidine can be made according to this process.

The amide derivatives of the present invention may be converted to amines by reduction. A suitable reducing agent is lithium aluminium hydride:

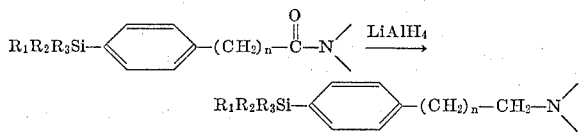

The new amide derivatives mentioned in this invention as well as the amines formed by their reduction show biological activity.

Specific embodiment of this invention are described in the following examples. These however, are merely illustrative and should not be considered as implying any limitations of the scope of this invention.

EXAMPLE 1 p-Trimethylsilyl phenylacetyl chloride

To a solution of p-trimethylsilyl phenylacetic acid (10.4 g., 0.05 mole) in benzene (50 ml.) thionylchloride (10 ml.) and dry calcium carbonate (15 g.) were added with stirring and heated to reflux for 2 hrs. The reaction mixture was filtered, the benzene and excess thionylchloride were removed in vacuo and the p-trimethylsilyl phenylacetyl chloride passed over at 117° C./4 mm.; yield 10 g. (90%).

*Analysis.*—Calcd. for $C_{11}H_{15}ClOSi$ (percent): C, 58.3; H, 6.6; Cl, 15.7. Found (percent): C, 58.4; H, 6.4; Cl, 15.8.

EXAMPLE 2

β-(p-Trimethylsilyl)-phenylpropionic acid

To a solution of sodium metal (4.6 g., 0.2 mole) in absolute ethanol (100 ml.), diethyl p-trimethylsilyl benzyl malonate (32.2 g., 0.1 mole) was added with stirring. The mixture was heated to reflux and water (5 ml.) was dropped in slowly. The reaction mixture was heated to reflux with stirring for an additional 15 min., cooled and the disodium salt of p-trimethylsilyl benzyl malonic acid (31 g.; 100%) was filtered and dried. It did not melt below 300° C.

Mole wt. calcd. for $C_{13}H_{16}O_4SiNa_2$: 310. Found: 309 (by titration with 0.1 N hydrochloric acid with methyl orange as indicator).

Disodium salt of p-trimethylsilylbenzyl malonic acid (15.5 g., 0.05 mole) was dissolved in water (100 ml.) and acidified with dilute hydrochloric acid to pH 4.5. The liberated p-trimethylsilylbenzylmalonic acid was extracted with ether. The ethereal extract was dried over sodium sulfate and the ether removed in vacuo. The residual malonic acid was decarboxylated by heating in vacuo (40 mm./Hg) in an oil bath at a temperature of 160–180° C. for 6 hr. to yield the β-(p-trimethylsilyl)-phenyl propionic acid, 9 g. (83%); M.P. 90° C. on recrystallization from petroleum ether.

*Analysis.*—Calcd. for $C_{12}H_{18}O_2Si$ (percent): C, 64.9; H, 8.1. Found (percent): C, 64.9; H, 8.0.

EXAMPLE 3

Preparation of β-(p-trimethylsilyl)-phenyl propionyl chloride

To a solution of β-(p-trimethylsilyl)-phenyl propionic acid (4.5 g., 0.02 mole) in dry benzene (15 ml.) thionyl chloride (6 ml.; excess) was added with stirring followed by powdered anhydrous calcium carbonate (8 g.) and heated to reflux for 2 hrs. The reaction mixture was filtered and the benzene and excess thionyl chloride was driven off in vacuo. The β-(p-trimethylsilyl)-phenyl propionyl chloride (3.6 g., 75%) passed at 112–114° C./1.5 mm.

*Analysis.*—Calcd. for $C_{12}H_{17}ClOSi$ (percent): C, 59.9; H, 7.1; Cl, 14.8. Found (percent): C, 60.0; H, 6.9; Cl, 14.8.

EXAMPLE 4

β-(p-Trimethylsilyl)-phenyl propanol

A solution of β-(p-trimethylsilyl)-phenyl propionic acid (11.1 g., 0.05 mole) in absolute ether (60 ml.) was dropped slowly during 30 min. into a suspension of $LiAlH_4$ (2.3 g., 0.06 mole) in absolute ether (60 ml.). Refluxing and stirring was continued for an additional 30 min., cooled, and cold water was slowly dropped in to destroy excess $LiAlH_4$ followed by 10% sulfuric acid (100 ml.). Stirring was continued until 2 clear layers were observed. The ethereal layer was separated and the aqueous layer was extracted with ether. The combined ethereal extracts were washed with 10% sodium carbonate solution, dried over sodium sulfate and the ether driven off in vacuo. The β-(p-trimethylsilyl)-phenyl propanol passed over at 111–113° C./0.5–1 mm.; yield 9.8 g. (94%).

*Analysis.*—Calcd. for $C_{12}H_{20}OSi$ (percent): C, 69.2; H, 9.6. Found (percent): C, 69.5; H, 9.3.

EXAMPLE 5

β-(p-Trimethylsilyl)-phenyl propyl chloride

Thionyl chloride (15 ml.) was dropped into a solution of β-(p-trimethylsilyl)-phenyl propanol (8.3 g.; 0.04 mole) in dry benzene (10 ml.) in the presence of anhydrous calcium carbonate (10 g.) and heated under reflux for 2.5 hrs. The reaction mixture was filtered and evaporated in vacuo. The p-trimethylsilyl-β-phenyl propyl chloride was collected 108–110° C./0.5–1 mm. Hg; yield 7.2 g. (80%).

*Analysis.*—Calcd. for $C_{12}H_{19}ClSi$ (percent): C, 63.6; H, 8.4. Found (percent): C, 63.8; H, 8.3.

EXAMPLE 6

β-(p-Trimethylsilyl)-phenyl propionitrile

A solution of β-(p-trimethylsilyl)-phenyl propyl chloride (4.53 g., 0.02 mole) in ethanol (10 ml.) was dropped into a solution of sodium cyanide (1.2 g., 0.024 mole) in water (3 ml.) and the reaction mixture was refluxed for about 40 hr. It was cooled, diluted with water and the nitrile was extracted with ether. The β-(p-trimethylsilyl)-phenyl propionitrile passed at 125° C./0.5–1 mm.

EXAMPLE 7

γ-(p-Trimethylsilylphenyl)-butyric acid p-Trimethyl silylphenylpropionitrile (2 g.) was added to a solution of potassium hydroxide (0.05 mole) in 20 ml. diethylene glycol and 3 ml. water and the reaction mixture refluxed for 10 hr. The reaction mixture was cooled, acidified and the acid was extracted with ether. The acid was purified by extraction from the ether by dilute alkali, acidification and re-extraction by ether. The ether was distilled out leaving γ-(p-trimethylsilylphenyl) butyric acid which boils at 154° C./1 mm. Hg.

EXAMPLE 8 p-Trimethylsilylbenzoyl-p-anisidide

To p-anisidine (2.46 g., 0.02 mole) in chloroform (25 ml.) a solution of p-trimethylsilyl benzoyl chloride (2.12 g., 0.01 mole) was dropped in with stirring and cooling. The reaction mixture was stirred for 2 hr. and left overnight. The chloroform was driven off in vacuo, dry acetone was added and the precipitated amine hydrochloride was filtered off. The filtrate was evaporated to dryness, and the residue washed with water, dilute sodium hydroxide, followed by dilute hydrochloric acid and recrystallized from aqueous-ethanol in the presence of active charcoal. Yield (2.7 g., 90%); M.P. 126° C.

*Analysis.*—Calcd. for $C_{17}H_{21}NOSi$ (percent): C, 68.2; H, 7.0; N, 4.7. Found (percent): C, 68.2; H, 6.95; N, 4.9.

EXAMPLE 9 p-Trimethylsilylbenzoyl-α-naphthylamide

The naphthylamide was prepared by the reaction of p-trimethylsilylbenzoyl chloride and α-naphthylamine by the procedure given in example 8, in 88% yield; M.P. 141° C. on recrystallization from dilute alcohol.

*Analysis.*—Calcd. for $C_{20}H_{21}NOSi$ (percent): C, 75.2; H, 6.6; N, 4.4. Found (percent): C, 75.2; H, 6.4; N, 4.7.

EXAMPLE 10 p-Trimethylsilyl-p-carbethoxy benzanilide

To a solution of p-carbethoxy aniline (benzocaine) (1.65 g., 0.01 mole) and triethylamine (1.4 g., 0.014 mole), in chloroform (25 ml.), a solution of p-trimethylsilyl benzoyl chloride (2.12 g., 0.01 mole) in chloroform (10 ml.) was added dropwise with stirring, which was continued for 5 hrs. and left overnight. The chloroform was driven off in vacuo, and the residue was triturated with 5% aqueous sodium hydroxide solution. The crystalline anilide was washed with 5% aqueous sodium hydroxide solution, dilute hydrochloric acid, followed by water, and recrystallized from aqueous ethanol in the presence of active charcoal; yield 3.1 g. (91%) of p-trimethylsilyl benzoyl p-carbethoxy anilide; M.P. 104° C.

*Analysis.*—Calcd. for $C_{19}H_{23}NO_3Si$ (percent): C, 66.9; H, 6.7; N, 4.1. Found (percent): C, 66.6; H, 6.4; N, 4.2.

EXAMPLE 11 p-Trimethylsilyl-N-n-butylbenzamide

To a cooled solution of n-butylamine (1.2 g., 0.02 mole) in tetrahydrofuran, p-trimethysilyl benzoyl chloride (2.12 g.; 0.01 mole) in tetrahydrofuran (10 ml.) was added dropwise with stirring. The reaction mixture was stirred for 3 hr. and left overnight. The precipitated amine hydrochloride was filtered off and washed with acetone. The combined tetrahydrofuran and acetone washings were distilled in vacuo and the residual oil was taken up in ether (80 ml.), washed with dilute sodium hydroxide solution followed by water, dried over $MgSO_4$, and the solvents were driven off in vacuo. The p-trimethylsilyl-N-butyl-benzamide (1.9 g.; 76%) melted at 66° C. on recrystallization from aqueous ethanol.

*Analysis.*—Calcd. for $C_{14}H_{23}NOSi$ (percent): C, 67.5; H, 9.2; N, 5.6. Found (percent): C, 67.8; H, 9.4; N, 5.5.

EXAMPLE 12 p-Trimethylsilylbenzamide derivative of 1-N-dimethylamino-2-propylamine p-Trimethylsilylbenzoyl chloride (2.12 g.; 0.01 mole) was dropped into a solution of 1-N-dimethylamino-2-propylamine in chloroform (25 ml.) stirred for 3 hr. and left overnight. The chloroform was driven off in vacuo, cold 5% sodium hydroxide solution (50 ml.) was added and the amide was taken up in ether. The ethereal extract was dried over $MgSO_4$ and fractionally distilled. The amide derivative (2.5 g., 90%) was collected at 170–173° C./1–2 mm. which solidified on cooling. The amide melted at 74° C. on recrystallization from benzene.

*Analysis.*—Calcd. for $C_{15}H_{26}N_2OSi$ (percent): N, 10.1. Found (percent): N, 10.4.

EXAMPLE 13 p-Trimethylsilylbenzoyl piperidine

The amide derivative was prepared in 84% yield by the procedure given in Example 12, and distilled in vacuo, B.P. 170–174° C./2–2.5 mm. On standing it crystallized to a solid melting at 45° C.

*Analysis.*—Calcd. for $C_{15}H_{23}NOSi$ (percent): C, 69.0; H, 8.8; N, 5.4. Found (percent): C, 68.8; H, 8.7; N, 5.5.

EXAMPLE 14

N-allyl, p-trimethylsilyl phenyl acetamide

A solution of p-trimethylsilylphenylacetyl chloride (2.3 g., 0.01 mole) in carbon tetrachloride (15 ml.) was added slowly dropwise with stirring into a solution of allylamine in carbon tetrachloride (25 ml.). The mixture was stirred for 5 hrs. and left overnight. The carbon tetrachloride was removed in vacuo, dry acetone was added and the precipitated allylamine hydrochloride was filtered off. The acetone was removed in vacuo, the residue washed with dilute alkali followed by water. The N-allyl p-trimethylsilyl phenyl acetamide (2.47 g.; 94%) melted at 102° C. on recrystallization from ethanol-water.

*Analysis.*—Calcd. for $C_{14}H_{21}NOSi$ (percent): C, 68.0; H, 8.5; N, 5.6. Found (percent): C, 68.0; H, 8.4; N, 5.7.

EXAMPLE 15

N-p-trimethylsilylbenzyl-p-trimethylsilylphenyl acetamide

A solution of p-trimethylsilylphenyl acetyl chloride (2.3 g., 0.01 mole) in chloroform (10 ml.) was added dropwise with stirring and cooling to a solution of p-trimethylsilyl benzylamine (3.6 g., 0.02 mole) in chloroform (25 ml.). The mixture was stirred for 3 hrs. and left overnight. The chloroform was removed in vacuo, dry acetone was added, and the p-trimethylsilyl benzylamine hydrochloride was filtered off, and washed with acetone. The acetone was distilled off in vacuo, and dilute sodium hydroxide solution (50 ml.) was added to the residual oil which solidified. The N-p-trimethylsilyl benzyl-p-trimethylsilylphenyl acetamide was filtered, washed with dilute alkali, acid and water to yield 3.2 g. (90%) of the amide; M.P. 118° C. on recrystallization from petroleum ether.

*Analysis.*—Calcd. for $C_{21}H_{31}NOSi_2$ (percent): C, 68.3; H, 8.4; N, 3.8. Found (percent): C, 68.2; H, 8.4; N, 4.0.

EXAMPLE 16

Ethyl N-(o-trimethylsilylbenzoyl)-glycinate

To a solution of o-trimethylsilyl benzoic acid (1.94 g., 0.01 mole) in methylene chloride (40 ml.) was added ethylglycinate hydrochloride (1.4 g., 0.01 mole) and triethyl amine (1 g., 0.01 mole). The mixture was stirred and a solution of dicyclohexyl carbodiimide (2.06 g., 0.01 mole) in methylene chloride (15 ml.) was added. The stirring was continued for 4 hrs. at room temperature, and left overnight. A few drops of acetic acid was added (to destroy unreacted dicyclohexyl carbodiimide) and the precipitate was filtered. The filtrate was washed with dilute hydrochloric acid, water and dried over sodium sulfate. The methylene chloride was driven off and the ethyl N-(o-trimethylsilylbenzoyl)-glycinate was distilled in vacuo. B.P. 156° C./1 mm. Hg, yield 2.3 g. (81%).

EXAMPLE 17 p-Nitrophenyl-(o-trimethylsilyl)-benzoate

To a stirred solution of ortho-trimethylsilylbenzoic acid (1.94 g., 0.01 mole) in methylene chloride (40 ml.) and p-nitrophenol (1.39 g., 0.01 mole), dicyclohexyl carbodiimide (2.1 g., 0.01 mole) was added. The reaction mixture was stirred for 4 hrs. and left overnight. It was filtered, and the filtrate was washed with 5% potassium carbonate solution, water and dried over sodium sulfate. The p-nitrophenyl (o-trimethylsilyl)-benzoate crystallized out on evaporation of the methylene chloride. The crude ester was recrystallized from petroleum ether to yield 2.6 g. (83%) of pure ester melting at 113° C.

EXAMPLE 18 p-Trimethylsilyl benzoyl hydrazine p-Trimethylsilyl benzoyl chloride (2.13 g., 0.01 mole) was added with stirring a 70% aqueous solution of hydrazine hydrate and stirred for an additional 30 min. The p-trimethylsilyl benzoyl hydrazine was filtered off, washed with water and dilute alkali. The substance melts at 227° C., yield 2.8 g.

EXAMPLE 19 p-Trimethylsilyl phenyl-aceto hydroxamic acid p-Trimethylsilyl phenyl acetyl chloride (2.3 g., 0.01 mole) was dropped into a stirred solution of hydroxylamine hydrochloride (7 g., 0.1 mole) in 20% sodium hydroxide solution (50 ml.). The stirring was continued for 30 min., the mixture was acidified and the p-trimethylsilylphenyl acetohydroxamic acid was filtered and washed with dilute alkali and water. It melted at 124° C. on recrystallization from aqueous ethanol. It gave a violet color reaction with ferric chloride solution.

EXAMPLE 20 o-Trimethylsilyl benzoyl guanidine o-Trimethylsilyl benzoyl chloride (2.13 g. (0.01 mole) was added to guanidine hydrochloride (1.2 g., 0.013 mole) in dry benzene (5 ml.) and heated under reflux for 1 hr. The reaction mixture was cooled and the benzene was driven off in vacuo. Water was added, and the residue was made alkaline with dilute sodium hydroxide solution. The precipitated o-trimethylsilyl benzoyl guanidine was filtered off and washed with water; M.P. 134° C. on recrystallization from aqueous ethanol.

EXAMPLE 21 p-Trimethylsilylphenylacetyl urea p-Trimethylsilylphenylacetyl chloride (2.3 g., 0.01 mole), urea (2 g., 0.033 mole excess) and benzene (3 ml.) were heated carefully for some minutes until reaction set in and then on a water bath for 2 hrs. The reaction mixture was cooled and poured into water (50 ml.). The precipitate was filtered and washed with dilute alkali and water; yield 1.9 g. (76%). The p-trimethylsilyl- phenylacetyl urea melted at 175–176° C. on recrystallization from ethanol-water.

*Analysis.*—Calcd. for $C_{12}H_{18}N_2O_2Si$ (percent): C, 57.6; H, 7.2; N, 11.2. Found (percent): C, 57.5; H, 7.3; N, 10.9.

EXAMPLE 22

β-(p-Trimethylsilylphenyl)-propionyl-morpholide

This compound was prepared from β-(p-trimethylsilylphenyl) propionyl chloride and morpholine by the procedure described in Example 12. Yield 93% B.P. 184° C./1 mm.; M.P. 41° C.

*Analysis.*—Calcd. for $C_{16}H_{25}NO_2Si$ (percent): C, 66.0; H, 8.6; N, 4.8. Found (percent): C, 66.0; H, 8.4; N, 4.5.

EXAMPLE 23 p-Trimethylsilylphenyl acetamide p-Trimethylsilyl phenyl acetyl chloride (0.45 g., 0.002 mole) was added dropwise into a concentrated ammonia solution (15 ml.) and stirred for 15 min. The precipitated p-trimethylsilyl phenyl acetamide (0.4 g., 95%) was filtered, washed with water and dried, M.P. 107° C. on recrystallization from aqueous ethanol.

*Analysis.*—Calcd. for $C_{11}H_{17}NOSi$ (percent): C, 63.8; H, 8.2; N, 6.8. Found (percent): C, 64.1; H, 8.0; N, 6.6.

EXAMPLE 24

β-(p-Trimethylsilylphenyl)-propionamide

The amide was prepared as in Example 23 from β-(p-trimethylsilylphenyl)-propionyl chloride in 83% yield, M.P. 98° C.

*Analysis.*—Calcd. for $C_{12}H_{19}NOSi$ (percent): C, 65.2; H, 8.6; N, 6.3. Found (percent): C, 65.0; H, 8.3; N, 6.3.

EXAMPLE 25

N-(p-trimethylsilyl)-benzyl piperidine

A solution of p-trimethylsilyl-benzoyl piperidine (1.3 g., 0.005 mole) in absolute ether (30 ml.) was added slowly with stirring to lithium aluminium hydride (0.5 g., 0.013 mole) in absolute ether (30 ml.). The reaction mixture was refluxed gently for 3 hrs. Water was dropped in cautiously to destroy unreacted $LiAlH_4$, followed by dilute sodium hydroxide solution. The reaction mixture was filtered, and the ethereal layer was separated. The aqueous layer was exhaustively extracted with ether. The combined ethereal solutions were treated with aqueous hydrochloric acid to extract the amine. The acid was made alkaline with sodium hydroxide and the liberated amine was taken up in ether, dried over sodium sulfate and filtered. Dry gaseous hydrogen chloride was passed through the ethereal solution to precipitate the amine hydrochloride. The ether was removed in vacuo, dry benzene was added and evaporated again. The crystalline N-(p-trimethylsilyl)-benzyl piperidine hydrochloride (1.0 g., 70%), melted at 216–218° C. on recrystallization from dry ethyl acetate.

Molec. wt.—Calcd. for $C_{15}H_{26}NSiCl$: 283.5. Found: 285, by titration with $AgNO_3$.

EXAMPLE 26 p-Trimethyl-silyl phenylacetyl-hydrazide

A solution of trimethyl silyl phenyl acetic acid (10.4 g. 0.05 mole) in n-butanol (15 ml.) was added to hydrazine hydrate (4 ml.) and heated azeotropically for 5 hrs. The butanol was removed in vacuo and petroleum ether was added to the residue. p-Trimethyl silyl phenyl acetyl-hydrazide crystallized out; yield 8.3 g. (80%), M.P. 118° C. on recrystallization from aqueous ethanol.

*Analysis.*—Calcd. for $C_{11}H_{18}N_2OSi$ (percent): C, 59.5; H, 8.1; N, 12.6. Found (percent): C, 59.5; H, 8.4; N, 13.1.

EXAMPLE 27 p-Trimethyl silyl benzoyl-homoveratryl amide

The substance was synthesized in 85% yield from p-trimethyl silyl benzoyl chloride and homoveratrylamine by the procedure described in Example 8. M.P. 116° C. on recrystallization from aqueous ethanol.

*Analysis.*—Calcd. for $C_{20}H_{27}NO_3Si$ (percent): C, 67.2; H, 7.6; N, 3.9. Found (percent): C, 67.3; H, 7.6; N, 3.7.

EXAMPLE 28 p-Trimethyl silyl phenyl acetyl-homoveratrylamide

The compound was synthesized by the reaction of p-trimethyl silyl phenyl acetyl chloride and homoveratrylamine in 84% yield by the procedure described in Example 8. It passed at 230°–234° C./1 mm. and solidified to crystals melting at 40° C.

*Analysis.*—Calcd. for $C_{21}H_{29}NO_3Si$ (percent): C, 68.0; H, 7.8; N, 3.7. Found (percent): C, 67.9; H, 7.5; N, 3.5.

EXAMPLE 29 p-(Trimethyl silyl methyl)-phenyl acetyl-homopiperonyl amide

This substance was prepared from p-(trimethyl silylmethyl) phenyl acetyl chloride and homopiperonyl amine by a similar procedure to that described in Example 10; yield 78%. M.P. 70° C.

*Analysis.*—Calcd. for $C_{21}H_{27}NO_3Si$ (percent): C, 68.3; H, 7.3. Found (percent): C, 68.3; H, 7.1.

EXAMPLE 30

N-(β-(p-trimethylsilylphenyl))-ethyl morpholine

The compound was synthesized by the reduction of p-trimethyl silyl phenyl acetyl morpholide by the procedure described in Example 25 in yield of 85%. B.P. 138–140° C./1 mm.

*Analysis.*—Calcd. for $C_{15}H_{25}NOSi$ (percent): C, 68.4; H, 9.5; N, 5.3. Found (percent): C, 68.7; H, 9.3; N, 5.2.

EXAMPLE 31

N-(β-(p-trimethylsilylphenyl))-ethyl piperidine

This substance was synthesized by the reduction of p-trimethylsilylphenylacetyl piperidine by the procedure described in Example 25 in 82% yield. B.P. 130–133° C./1 mm.

*Analysis.*—Calcd. for $C_{16}H_{27}NSi$ (percent): C, 73.6; H, 10.3; N, 5.4. Found (percent): C, 73.8; H, 10.3; N, 5.3.

EXAMPLE 32

Lowering of the blood pressure by N-(p-trimethylsilyl-β-phenylethyl) morpholine hydrochloride (BYA–232) and by p-trimethylsilylphenylacetyl hydrazide (BYA–236)

Method: Blood pressure evaluation.—Four cats were used in the study. The cats were anaesthetized with 35 mg./kg. sodium pentobarbital intraperitoneally. The femoral vein was cannulated for injection of drugs. The systemic blood pressure was recorded from a cannulated femoral artery with the aid of a Statham strain gauge pressure transducer (P–23A) attached to a Grass Model 5 Polygraph. The electrocardiogram (Lead II) was recorded using needle electrodes in the skin, and respiration was recorded using the polygraph by means of a thermocouple inserted into a tracheal cannula. After stability in the above parameters was obtained, 5 mg./kg. of the test drug was injected intravenously. If there was no observed change in blood pressure, or if the change was transient, additional 5 mg./kg. was administered. If still no effect was observed, an additional 10 mg./kg. of the test substance was given. All drugs were administered in a volume of no greater than 2 ml.

TABLE I

| Compound | Dose mg./kg. | Mean arterial blood pressure (mm. Hg) | | Percent change | Duration of activity (min.) | Remarks |
|---|---|---|---|---|---|---|
| | | Control | Peak response | | | |
| BYA–232 | 5 | 185 | 105 | 43 | 5 | ECG-slight bradycardia. |
| | *5 | 185 | 120 | 35 | 5 | Do. |
| | *10 | 185 | 65 | 65 | 40 | Do. |
| BYA–236 | 5 | 175 | 160 | 8 | 5 | Hypernea, usination and defectation. |
| | *5 | 180 | 150 | 17 | 5 | Hypernea |
| | *10 | 180 | 160 | 11 | 5 | Do. |

*Additive doses.

EXAMPLE 33

The following compounds were tested for anti-convulsive properties:

| Compound | Name of Compound | Formula |
|---|---|---|
| BYA 202 | p-Trimethylsilyl benzoyl-p-anisidide | Me₃Si–⟨C₆H₄⟩–C(O)–NH–⟨C₆H₄⟩–OMe |
| BYA 204 | N-allyl-p-trimethylsilylphenyl acetamide | Me₃Si–⟨C₆H₄⟩–CH₂–C(O)–NHCH₂–CH=CH₂ |
| BYA 205 | p-Trimethylsilylbenzoyl-1-dimethylamino-2-propylamide | Me₃Si–⟨C₆H₄⟩–C(O)–NH–CH(CH₃)–CH₂–N(CH₃)₂ |
| BYA 206 | p-Trimethylsilylbenzoyl-(p-trimethylsilyl)phenylacetamide | Me₃Si–⟨C₆H₄⟩–C(O)–NH–CH₂–⟨C₆H₄⟩–SiMe₃ |
| BYA 207 | p-Trimethylsilylbenzoyl-p-carbethoxy anilide | Me₃Si–⟨C₆H₄⟩–C(O)–NH–⟨C₆H₄⟩–C(O)–OC₂H₅ |
| BYA 208 | p-Trimethylsilylphenylacetyl urea | Me₃Si–⟨C₆H₄⟩–CH₂–C(O)–NH–C(O)–NH₂ |

METHODS

Administration: All test compounds were administered orally in fine suspensions of 3% Acacia by stomach tube to 18 hours fasted mice receiving water ad libitum.

Anticonvulsive tests (a) Supramaximal electroshock (Toman, J. E. P. and G. M. Everett, "Evaluation of Drug Activities: Pharmacometrics" vol. 1, Acad. Press, 1964).

In order to determine time of maximum effect, groups of animals were tested once at different time intervals following administration of compounds. The following parameters were recorded:

Brief tonic limb flexion (T. F.)
Prolonged full tonic limb extension (T. Ex.)

Prevention of full tonic limb extension was considered as protection against supramaximal electroshock.[1]

(b) Anti-Metrazol seizure test: (Goodman, L. S. et al. 1953, J. Pharmacol. 108:168).

Compounds were administered at different time intervals prior to the subcutaneous injection of 100 mg./kg. Metrazol. Death rate was chosen as index for protective effects.[1]

---

[1] In both tests the compounds were administered to groups of 4 mice (♂ 22–24 g.) per dose level and maximal volume administered did not exceed 0.2 ml./20 g. Methylphenylethylhydantoin ("Mesantoin"), Phenobarbital-Na ("Luminal") and Phenylacetyl-urea were administered as reference drugs.

RESULTS
[a. Supramaximal electroshock]

| Compound | Dose (mg./kg.) | Time after administration (hours) | T.F. | T. Ex. |
|---|---|---|---|---|
| BYA 202 | 100 | ½ | 4 | 3 |
|  | 100 | 1 | 4 | 0 |
|  | 100 | 2 | 4 | 0 |
|  | 100 | 3 | 3 | 1 |
|  | 50 | ½ | 4 | 4 |
|  | 50 | 1 | 4 | 3 |
|  | 50 | 2 | 4 | 0 |
|  | 50 | 3 | 4 | 2 |
|  | 25 | ½ | 4 | 3 |
|  | 25 | 1 | 4 | 3 |
|  | 25 | 2 | 4 | 3 |
|  | 25 | 3 | 4 | 4 |
| BYA 204 | 100 | ½ | 4 | 3 |
|  | 100 | 1 | 4 | 1 |
|  | 100 | 2 | 4 | 2 |
|  | 100 | 3 | 4 | 1 |
|  | 50 | ½ | 4 | 3 |
|  | 50 | 1 | 4 | 2 |
|  | 50 | 2 | 4 | 2 |
|  | 50 | 3 | 4 | 1 |
|  | 25 | ½ | 4 | 3 |
|  | 25 | 1 | 4 | 2 |
|  | 25 | 2 | 4 | 1 |
|  | 25 | 3 | 4 | 1 |
| BYA 205 | 100 | ½ | 4 | 0 |
|  | 100 | 1 | 4 | 1 |
|  | 100 | 2 | 4 | 1 |
|  | 50 | ½ | 4 | 3 |
|  | 50 | 1 | 4 | 3 |
|  | 50 | 2 | 4 | 4 |
|  | 25 | ½ | 4 | 3 |
|  | 25 | 1 | 4 | 4 |
|  | 25 | 2 | 4 | 4 |
| BYA 206 | 100 | ½ | 4 | 4 |
|  | 100 | 1 | 4 | 4 |
|  | 50 | ½ | 4 | 4 |
|  | 50 | 1 | 4 | 3 |
|  | 25 | ½ | 4 | 4 |
|  | 25 | 1 | 4 | 4 |
| BYA 207 | 100 | ½ | 4 | 4 |
|  | 100 | 1 | 4 | 2 |
|  | 100 | 2 | 4 | 0 |
|  | 100 | 3 | 4 | 3 |
|  | 50 | ½ | 4 | 4 |
|  | 50 | 1 | 4 | 2 |
|  | 50 | 2 | 4 | 3 |
|  | 50 | 3 | 4 | 4 |
|  | 25 | ½ | 4 | 4 |
|  | 25 | 1 | 4 | 3 |
|  | 25 | 2 | 4 | 3 |
|  | 25 | 3 | 4 | 4 |
| BYA 208 | 100 | ½ | 4 | 1 |
|  | 100 | 1 | 4 | 0 |
|  | 100 | 2 | 4 | 0 |
|  | 100 | 3 | 4 | 0 |
|  | 50 | ½ | 4 | 2 |
|  | 50 | 1 | 4 | 1 |
|  | 50 | 2 | 4 | 0 |
|  | 50 | 3 | 4 | 1 |
|  | 25 | ½ | 4 | 3 |
|  | 25 | 1 | 4 | 2 |
|  | 25 | 2 | 4 | 0 |
|  | 25 | 3 | 4 | 3 |
| Phenylacetyl-urea | 100 | ½ | 4 | 2 |
|  | 100 | 1 | 4 | 0 |
|  | 100 | 2 | 4 | 1 |
|  | 50 | ½ | 4 | 1 |
|  | 50 | 1 | 4 | 1 |
|  | 50 | 2 | 4 | 4 |
|  | 25 | ½ | 4 | 3 |
|  | 25 | 1 | 4 | 3 |
|  | 25 | 2 | 4 | 4 |
| Methylphenylhydantoin | 25 | 1½ | 4 | 0 |
|  | 10 | 1½ | 4 | 3 |
| Phenobarbital-Na | 20 | 1 | 4 | 0 | b. Anti-metrazol test

| Compound | Dose (mg./kg.) | Time after administration (hours) | Survivors |
|---|---|---|---|
| BYA 202 | 100 | ½ | 0 |
|  | 50 | ½ | 0 |
| BYA 204 | 100 | ½ | 0 |
|  | 100 | 1 | 0 |
|  | 50 | ½ | 0 |
|  | 50 | 1 | 0 |
| BYA 205 | 100 | ½ | 0 |
|  | 100 | 1 | 0 |
|  | 50 | ½ | 0 |
|  | 50 | 1 | 0 |
| BYA 206 | 100 | ½ | 0 |
|  | 100 | 1 | 0 |
|  | 50 | ½ | 0 |
|  | 50 | 1 | 0 |
| BYA 207 | 100 | ½ | 0 |
|  | 100 | 1 | 0 |
|  | 50 | ½ | 0 |
|  | 50 | 1 | 0 |
| BYA 208 | 100 | ½ | 2 |
|  | 100 | 1 | 2 |
|  | 100 | 2 | 2 |
|  | 50 | ½ | 2 |
|  | 50 | 1 | 1 |
|  | 50 | 2 | 1 |
|  | 25 | ½ | 1 |
|  | 25 | 1 | 0 |
|  | 25 | 2 | 0 |
| Phenylacetyl-urea | 100 | ½ | 2 |
|  | 100 | 1 | 2 |
|  | 100 | 2 | 2 |
|  | 50 | ½ | 0 |
|  | 50 | 1 | 1 |
|  | 50 | 2 | 0 |
|  | 25 | ½ | 1 |
|  | 25 | 1 | 1 |
|  | 25 | 2 | 0 |
| Methylphenyl-hydantoin | 100 | ½ | 4 |
|  | 100 | 1 | 4 |
|  | 50 | ½ | 2 |
|  | 50 | 1 | 3 |
|  | 25 | ½ | 2 |
|  | 25 | 1 | 2 |
| Phenobarbital-Na | 25 | 1 | 4 |

SUMMARY

Full protection against convulsions, as measured by the supramaximal electroshock test, was shown by compounds BYA 202, 207 and 208 at a dose of 100 mg./kg. at 2 hours following their administration. Among these three, only BYA 208 exhibited an anti-convulsive activity at a comparable dose range to that of reference compounds tested. In fact, BYA 208 was more effective in this respect than its parent compound phenylacetyl-urea and was the only experimental compound having any anti-convulsive effect in the anti-Metrazol test.

EXAMPLE 34

Effects on blood pressure of compounds: p-trimethyl silyl benzoyl-p-anisidide (BYA-202); N-allyl p-trimethyl silyl phenyl acetamide (BYA-204); p-trimethyl silyl benzoyl-dimethyl amino-2-propylamide (BYA 205);

Materials: All the materials were dissolved in propylene glycol. In no case the volume injected exceeded 0.15 ml.

Methods: Effects on blood pressure, respiration rate and heart rate.—Male cats (2–13 kg. body-weight), anaesthetized with Nembutal 35 mg./kg. intraperitoneally were used. Blood pressure was measured from the left carotid artery with a Hg-manometer and recorded on a kymograph. Respiration rate and heart rate were recorded on the physiograph with impedance electrodes and ECG transducer, respectively. Time was recorded. Substances were injected through a cannula in the left femoral vein.

Results: The effects of BYA 202, BYA 204, BYA 205 are presented in the following table.

It will be obvious to those skilled in the art that various changes may be made without departing from the spirit of the invention and therefore the invention is not limited to what is shown in the drawings and described in the specification, but only as indicated in the appended claims.

What is claimed is:

1. An organosilicon compound having the formula:

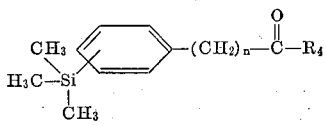

wherein $n$ is zero, 1 or 2; and $R_4$ is a residue of anisidine, allyl amine, 1-dimethylamino-2-propylamine, (trimethylsilyl) benzyl amine, p-carbethoxy aniline, urea, morpholine, hydroxyl amine, hydrazine, thiourea, or guanidine, or a residue of ammonia when $n$ is one or two, all said residues being connected through nitrogen to the C=O group.

2. Trialkylsilylbenzoyl guanidine and trialkylsilyl phenylacetyl guanidine, as claimed in claim 1.

3. p-Trimethylsilylphenylacetylurea as claimed in claim 1.

Table II
[Effects on blood pressure, respiration rate and heart rate]

| Compound | Dose (mg./kg.) | Blood pressure | | Respiration rate increase (percent of control) | Heart rate | Remarks* |
| | | Decrease (mm. Hg) | Duration (min.) | | | |
|---|---|---|---|---|---|---|
| BYA 202 | 1 | 0 | | 14 | No change | Died within 4 min. of infection. |
| | 2 | 5 | 1 | 30 | do | |
| | 4 | 5 | 1 | 36 | Arrhytmias | |
| | 6 | 130 | 3 | 50 | do | |
| BYA 204 | 1 | 20 | 2 | 41 | No change | |
| | 2 | 30 | 2 | 40 | do | |
| BYA 205 | 1 | 30 | 4 | 22 | do | |
| | 2 | 40 | 4 | 35 | do | |
| | 4 | 70 | 20 | 83 | do | |
| | 6 | 100 | 60 | 81 | do | |

*Figures represent mean values obtained from at least two separate experiments for each dose level.

References Cited

UNITED STATES PATENTS 2,647,137   7/1953   Frisch et al. _____ 260—448.2

TOBIAS E. LEVOW, Primary Examiner

A. P. DEMERS, Assistant Examiner

U.S. Cl. X.R.

260—241, 247, 293, 298, 999; 424—184

UNITED STATES PATENT OFFICE
CERTIFICATE OF CORRECTION

Patent No. 3,558,683          Dated January 26, 1971

Inventor(s) IGAL BELSKY et al.

It is certified that error appears in the above-identified patent and that said Letters Patent are hereby corrected as shown below:

Column 6, line 12, "$R_{18}$" should read --$H_{18}$--;

Column 15, line 9, "13" should read --3--.

Signed and sealed this 6th day of July 1971.

(SEAL)
Attest:

EDWARD M. FLETCHER, JR.          WILLIAM E. SCHUYLE
Attesting Officer                Commissioner of Pa